(12) United States Patent
Odgaard et al.

(10) Patent No.: US 6,800,391 B2
(45) Date of Patent: Oct. 5, 2004

(54) MEMBRANE ELECTRODE ASSEMBLIES FOR DIRECT METHANOL FUEL CELLS AND METHODS FOR THEIR PRODUCTION

(75) Inventors: Madeline Odgaard, Odense (DK); Steen Yde-Andersen, Svendborg (DK)

(73) Assignee: IRD Fuel Cell A/S, Svendborg (DK)

(*) Notice: Subject to any disclaimer, the term of this patent is extended or adjusted under 35 U.S.C. 154(b) by 414 days.

(21) Appl. No.: 10/038,561

(22) Filed: Nov. 9, 2001

(65) Prior Publication Data

US 2002/0098405 A1 Jul. 25, 2002

Related U.S. Application Data

(60) Provisional application No. 60/248,076, filed on Nov. 9, 2000.

(51) Int. Cl.[7] ................................ H01M 8/02
(52) U.S. Cl. ........................... 429/41; 429/44
(58) Field of Search ........................ 429/41, 44

(56) References Cited

U.S. PATENT DOCUMENTS

| | | | |
|---|---|---|---|
| 4,469,579 A | 9/1984 | Covitch et al. | 204/283 |
| 4,826,554 A | 5/1989 | McIntyre et al. | 156/280 |
| 5,211,984 A | 5/1993 | Wilson | 427/115 |
| 5,272,017 A | 12/1993 | Swathirajan | 429/33 |
| 5,316,871 A | 5/1994 | Swathirajan | 429/33 |
| 5,399,184 A | 3/1995 | Harada | 29/623.4 |
| 5,472,799 A | 12/1995 | Watanabe | 429/30 |
| 5,474,857 A | 12/1995 | Uchida et al. | 429/33 |
| 5,599,638 A * | 2/1997 | Surampudi et al. | 429/33 |
| 5,702,755 A | 12/1997 | Mussell | 427/115 |
| 6,030,718 A * | 2/2000 | Fuglevand et al. | 429/26 |

* cited by examiner

*Primary Examiner*—Mark Ruthkosky
(74) *Attorney, Agent, or Firm*—Licata & Tyrrell P.C.

(57) ABSTRACT

A method of producing a membrane electrode assembly for use in direct methanol fuel cells by serigraphically printing cathode catalysts or anode catalysts with a carbon backing layer onto graphite or carbon paper, boiling impurities from these layers, and bonding the boiled, printed cathode and anode catalyst layers onto opposite sides of a polymer electrolyte membrane via semi-isostatic compression in a constraint which restricts volume and lateral defamation is provided. Also provided are membrane electrode assemblies produced in accordance with this method.

1 Claim, 1 Drawing Sheet

MEMBRANE ELECTRODE ASSEMBLIES FOR DIRECT METHANOL FUEL CELLS AND METHODS FOR THEIR PRODUCTION

This application claims the benefit of provisional application 60/248,076 filed on Nov. 9, 2000.

FIELD OF THE INVENTION

The present invention relates to membrane electrode assemblies for use in direct methanol fuel cells. The membrane electrode assemblies of the present invention comprise a polymer electrolyte membrane with cathode and anode layers having a low content of catalysts with cathode and anode layers on either side of the membrane. The membrane electrode assemblies are serigraphically printed on an electron conducting substrate such as graphite or carbon paper with an ink comprising catalyst loaded carbon and water dispersed polymer electrolyte membrane material dispersed in a mixture of water, propanol and methanol. Following printing, the anode and cathode layers are boiled in deionized water to remove impurities. The anode and cathode layers and the polymer electrolyte membrane are then placed in a constraint and axially or semi-isostatically compressed, preferably via heat, to form the membrane electrode assemblies.

BACKGROUND OF THE INVENTION

Fuel cells are energy conversion devices being considered as a possible alternative to internal combustion engines. One type of fuel cell comprises a solid polymer electrolyte (SPE) membrane, such as a sulfonated fluorinated polymer membrane material like NAFION, which provides ion exchange between the cathode and anode electrodes. Various configurations of SPE fuel cells as well as methods for their preparation have been described. See e.g. U.S. Pat. Nos. 4,469,579; 4,826,554; 5,211,984; 5,272,017; 5,316,871; 5,399,184; 5,472,799; 5,474,857; and 5,702,755.

SPE fuel cells offer several advantages over liquid electrolyte fuel cells. These include greater power densities, lower operating temperatures, and longer operating lifetimes. In addition, SPE materials are generally resistant to corrosion and easy to incorporate into fuel cell structures. Accordingly, attempts have been made to utilize these various solid polymer electrolyte (SPE) fuel cells as an electronic power source for electric automobiles and space crafts.

However, the need for a catalyst such as platinum in the SPE fuel cells has made these cells more expensive than alternative energy sources.

The present invention provides a method for producing SPE fuel cells with lower catalyst content and enhanced electrochemical efficiency.

SUMMARY OF THE INVENTION

An object of the present invention is to provide a method for producing membrane electrode assemblies for use in direct methanol fuel cells which comprises serigraphically printing cathode and anode catalyst layers onto graphite or carbon paper; boiling the printed cathode and anode layers to remove impurities; placing a polymer electrolyte membrane between the cathode and anode layers and inserting them into a constraint which restricts their volume and lateral defamation; and semi-isostatically compressing the cathode and anode layers to the polymer electrolyte membrane.

Another object of the present invention is to provide a more electrochemically efficient membrane electrode assembly comprising a polymer electrolyte membrane and printed anode and cathode layer comprising a low content of catalysts located on either side of the polymer electrolyte membrane, wherein the printed anode and cathode layers were washed to remove impurities prior to assembly.

DETAILED DESCRIPTION OF THE INVENTION

Figure 1:
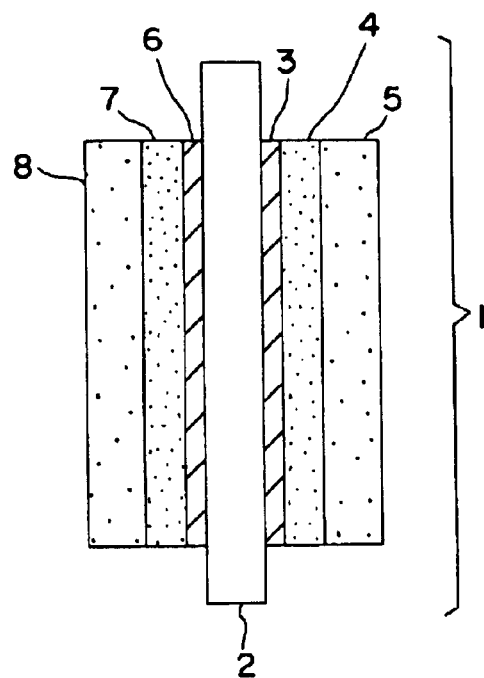
FIG. 1 provides a side view of a membrane electrode assembly of the present invention including the polymer electrolyte membrane as well as the washed anode and cathode layers on the carbon or graphite paper.
Figure 2:
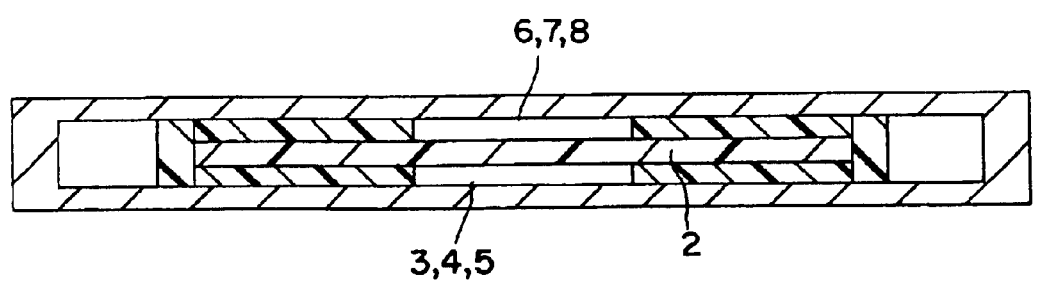
FIG. 2 provides a side view of a membrane electrode assembly within an aluminum foil constraint following semi-isostatic compression.

The present invention relates to membrane electrode assemblies with increased electrochemical efficiency and methods for producing these assemblies for use in direct methanol fuel cells. A membrane electrode assembly of the present invention is depicted in FIG. 1. As shown in FIG. 1, the membrane electrode assembly 1 comprises a polymer electrolyte membrane (PEM) 2. As also shown in FIG. 1, a cathode catalyst 3 and porous carbon backing layer 4, which are applied preferably via serigraphic printing to a graphite or carbon paper 5, are attached to one side of the polymer electrode membrane 2 so that the cathode catalyst 3 is adjacent to the polymer electrolyte membrane 2. An anode catalyst 6 and porous carbon backing layer 7, which are applied preferably via serigraphic printing to a graphite or carbon paper 8, are attached to the opposite side of the polymer electrode membrane 2. The cathode catalyst 3 comprises conductive carbon black loaded with a catalyst. This layer 3 is cast with a homogenous ink comprising carbon black supported platinum catalyst and polytetrafluoroethylene (PTFE) uniformly dispersed in a solution of ionomer. PTFE is included in the cathode catalyst layer 3 at a wt % sufficient to render the cathode catalyst material hydrophobic in nature on the oxygen side and to fill the free percolation volume of the contacting particles so that porosity is significantly minimized. The concentration of PTFE in the cathode catalyst 3 is from 5 to 42 wt % with the concentration range of 25 to 32 wt % being preferred. The anode catalyst 6 is cast using a homogenous ink composition prepared from a soluble form of the ionomer, conductive carbon black supported platinum, a noble metals such as Ru, Rd, Pd, Re, Os or Ir and PTFE. The anode catalyst 6 comprises less PTFE as compared to the cathode catalyst 3. PTFE concentrations range from 5 to 20 wt % with 7 wt % being preferred. The porous carbon backing layers 4 and 7 are comprised of carbon black and a polymer electrolyte material. The carbon backing layers are cast between the cathode catalyst layer 3 or anode catalyst layer 6 and porous graphitized paper layers 5 and 8 using a homogenous ink containing conductive carbon black particles, dispersed ionomer and polytetrafluoroethylene. Following application of each cathodic and anodic layer to the graphite or carbon paper, they are boiled for several hours to remove impurities.

The complete assembly with both the washed cathodic layers and washed anodic layers of the electrode structure in place is then simultaneously bonded to the wet polymer electrolyte membrane by semi-isostatic compression in a constrain which restricts volume and lateral defamation of the materials. In a preferred embodiment, heat compression is used at a temperature ranging between 120° and 180° C., preferably 135° C. to 169° C., more preferably 140° C., and a surface pressure of 10 to 150 bar, preferably 10 to 40 bar, more preferably 20 bar. A preferred constraint for use in this compression comprises an aluminum foil envelope sealed via a hot melt adhesive and line with Teflon sheeting to provide for lateral accommodation of the membrane electrode assembly.

In contrast to prior art procedures, to produce the assembly of the present invention, the cathode and anode catalyst layers are applied, preferably via serigraphic printing, to the porous graphite or carbon paper and not to the polymer electrolyte membrane, thus reversing the usual procedure for assembly. Accordingly, this method of production eases assembly as it ensures intimate contact and adherence of the catalyst layer to the polymer electrolyte membrane. Further, the method of present invention provides a more logical sequencing in that the layer requiring highest compaction is positioned to be in direct contact with the polymer electrolyte membrane. Thus, application of heat and pressure ensure good adhesion and cohesion of the catalyst layers while avoiding subsequent loss of contact and delamination on thermal cycling. The carbon and backing layer as well as the carbon or graphite paper provide for optimal gas permeability.

Further, after application of each layer, the cathode and anode layers are boiled for several hours to remove impurities. Each layer is dried before the next layer is printed and superimposed. Preferred boiling and drying conditions for the layers are described in the following examples.

Membrane electrode assemblies prepared in accordance with the method of the present invention have been demonstrated to have increased electrochemical efficiency as compared to standard membrane electrode assemblies. Specifically, fuel cells with the new membrane assemblies exhibited higher cell voltage at the same current density as fuels cells prepared in accordance with standard methods. Accordingly, the membrane electrodes assemblies of the present invention provide more efficient fuel cells for use in transportation and other areas.

The following nonlimiting examples are provided to further illustrate the present invention.

EXAMPLES

Example 1

Preparation of Anode Catalyst Layer Ink

Water and glycerine are added to the anode catalyst (60 wt % Pt-Ru mixed with added carbon (C) to weight ratios of 1:2 for catalyst and water and 1:4 for water and glycerine). The solid content or dry matter contained in the liquid dispersion is between 1 and 6 vol %. The mixture is homogenized and dispersed using an Ultra Turrax micronizing attritor at 8000 RPM for 15 minutes.

A solubilized perfluorosulfonate ionomer such as NAFION (E.I. duPont, Fayetville, N.C.) in 5 wt % solid content propanol solution is available from Solution Technology, Inc. (Mendenhall, Pa.). A catalyst composition having a metal to dry NAFION ratio of 95.5 wt % Pt/Ru:7.5 wt % dry NAFION is then added. This mixture is then homogenized and dispersed using an Ultra Turrax micronizing attritor at 8000 RPM for 15 minutes.

To obtain proper ink viscosity suitable for screen printing, 50 vol % of the mixed suspension dispersion media is then removed by evaporation upon stirring when the greater part of the low molecular weight volatile solvents and contaminants are removed. The material is then dispersed using an Ultra Turrax micronizing attritor at 8000 RPM.

Example 2

Preparation of Anode Carbon Layer

Water and glycerine are added to conductive carbon black in weight ratios of 5:7:35 for carbon:water:glycerol. A solubilized perfluorosulfonate ionomer such as NAFION in 5% solution in weight percent of 7.5:92.5 for NAFION(dry) :C is then added. The components are then mixed by micronizing attrition with an Ultra-Turrax attritor for at least 10 minutes at 8000 RPM in order to completely disperse the carbon black in the ionomeric base.

Example 3

Preparation of Anode Carbon Paper

Carbon paper (Toray Inc. Supplied by E-TEK, Inc. Natick, Mass.) is impregnated by immersion in a dispersion of polytetrafluoroethylene (PTFE). In one embodiment, a diluted 60% PTFE emulsion is used. Typically, a suspension contains 1–20 wt % of the PTFE in water. In this example 5 wt % of PTFE dispersed in water is used. The impregnated carbon paper is dried at 90° C. for approximately 12 hours and finally sintered at 370° C. for 20 minutes.

Example 4

Printing

The anode carbon layer is screen printed onto the hydrophobic carbon paper with a total loading of approximately 2 mg C-NAFION/cm$^2$. This is obtained via a sequence of repeated printing operations until the required loading is printed on the paper. One layer is printed at a time followed by thermal drying and consolidation treatment comprising a first step at 40° C. for 15 minutes and a second step at 100° C. under vacuum for 20 minutes. The open porous assembly of carbon structure and the superimposed carbon layer thus obtained is then boiled in deionized water for 1 hour. Typically 2 steps are required to remove residual solvents and contaminants and attain a loading of 2 mg/cm$^2$.

The anode catalyst layer is then printed onto the carbon layer. One application is performed followed by curing which comprises a first step at 40° C. for 15 minutes followed by a second step at 100° C. under vacuum for 20 minutes. Multiple applications are added until the desired catalyst loading, preferably $\leq 1.0$ mg PtRu/cm$^2$, is attained in the anode catalyst layer.

The resulting porous anode structure is then boiled in deionized water for at least 1–2 hours in order to completely remove volatile contaminants and solvents.

Example 5

Preparation of Cathode Catalyst Layer Ink

Water and glycerine are added to the cathode catalyst (60 wt % Pt/C) to weight ratios of 1:2 for catalyst:water and 1:4 for water:glycerine. A solubilized perfluorosulfonate ionomer such as NAFION in 5% solution is added in an amount so that the cured electrode is composed of 25 wt % of the ionomer. Polytetrafluoroethylene in a 60% dispersion to weight ratios depending on the supported catalyst composition used is then added. For example, 30–40 wt % PTFE is used for 20 wt % Pt—C; 10–20 wt % PTFE is used for 60 wt % Pt—C.

The components are throughly mixed by attrition as described in Example 1 for at least 10 minutes to uniformly disperse the supported cathode catalyst material.

To obtain proper ink viscosity suitable for screen printing, 50 vol % of the mixed suspension dispersion media is then removed by evaporation upon stirring and finally mixed using an Ultra Turrax micronizing attritor at 8000 RPM.

Example 6

Preparation of Cathode Carbon Layer Ink

Water and glycerine were added to carbon black in weight ratios of 1:1:4 for carbon:water:glycerine. Solubilized perfluorosulfonate ionomer such as NAFION in 5% solution and polytetrafluoroethylene (PTFE) in a 60% dispersion in wt % of 25:10:65 for NAFION(dry):PTFC:C was added. The components were mixed by mechanical stirring for at least 10 minutes to disperse the carbon black in the ionomer.

Example 7

Preparation of Hydrophobic Cathode Carbon Paper

Carbon paper (Toray Inc. Supplied by E-TEK, Inc. Natick, Mass.) is impregnated by immersion in a dispersion of polytetrafluoroethylene. In one embodiment, a diluted 60% PTFE emulsion is used. Typically, a suspension contains 20 wt % of the PTFE in water. The impregnated carbon paper is dried at 90° C. for approximately 12 hours and finally sintered at 370° C. for 20 minutes.

Example 8

Printing

The cathode carbon layer is applied onto the wet proofed carbon paper with loading of typically 2 mg/cm2 by screen printing in the same manner as described for the anode layer in Example 4. One layer is printed at a time followed by thermal treatment consisting of a first step at 40° C. for 15 minutes and a second step at 100° C. under vacuum for 20 minutes. The resulting porous structure is then boiled in deionized water for 1 hour.

The cathode catalyst layer is then printed onto the carbon layer. One layer is printed at a time followed by a curing which comprises a first step at 40° C. for 15 minutes and a second step at 100° C. under vacuum for 20 minutes. The resulting porous cathode structure is again boiled in deionized water for 1 hour.

Example 9

Bonding of Electrode Structures

The anode and cathode structures are then hot pressed at 140° C. for 4 minutes and a specific surface pressure of 10 to 150 kg/cm$^2$ to a solid polymer membrane such as NAFION 117 which has been previously equilibrate in water for 24 hours before use. Preferably 20 kg/cm$^2$ surface specific pressure is used. No hydraulic line pressure is used.

What is claimed is:

1. A method of producing a membrane electrode assembly for use in direct methanol fuel cells comprising:

(a) serigraphically printing a cathode carbon backing layer onto graphite or carbon paper;

(b) boiling the printed cathode carbon backing layer and graphite or carbon paper;

(c) serigraphically printing a carbon cathode catalyst onto the boiled, printed carbon backing layer and graphite or carbon paper to produce a cathode layer;

(d) boiling the cathode layer;

(e) serigraphically printing an anode carbon backing layer on graphite or carbon papers;

(f) boiling the printed anode carbon backing layer and graphite or carbon paper;

(g) serigraphically printing a carbon anode catalyst onto the boiled, printed anode carbon backing layer and graphite or carbon paper to produce an anode layer;

(h) boiling the anode layer;

(I) inserting a polymer electrolyte membrane between the boiled cathode layer and boiled anode layer and placing the membrane and cathode and anode layers into a constraint which restricts volume and lateral defamation; and (j) semi-isostatically compressing the membrane and cathode and anode layers into a membrane electrode assembly.

* * * * *